United States Patent [19]
Hambrick et al.

[11] 3,908,317
[45] Sept. 30, 1975

[54] RAIL BASE GRINDING APPARATUS

[76] Inventors: Lester N. Hambrick, 121 Woodland Dr., Irving, Tex. 75060; Carl C. Flowers, 2872 Alden Ave., Dallas, Tex. 75211

[22] Filed: June 29, 1973

[21] Appl. No.: 376,882

Related U.S. Application Data

[63] Continuation of Ser. No. 169,986, Aug. 9, 1971, abandoned.

[52] U.S. Cl. ................................................ 51/178
[51] Int. Cl.² ...................................... B24B 24/00
[58] Field of Search ........................................ 51/178

[56] References Cited
UNITED STATES PATENTS

| | | | |
|---|---|---|---|
| 2,983,085 | 5/1961 | Lutts | 51/178 |
| 3,154,892 | 11/1964 | Kruger | 51/178 |
| 3,205,623 | 9/1965 | Clayborne et al. | 51/178 |
| 3,566,546 | 3/1971 | Lindmark | 51/140 |
| 3,593,465 | 7/1971 | Krippes | 51/178 |

*Primary Examiner*—James L. Jones, Jr.
*Attorney, Agent, or Firm*—Richards, Harris & Medlock

[57] ABSTRACT

A rail base grinding apparatus comprises a self-powered vehicle adapted for movement along a trackway to the location of a welded joint formed between two rails in the trackway. A pantograph linkage extends from one side of the vehicle and supports a lead screw which in turn supports a grinding mechanism. The pantograph linkage serves to manipulate the grinding mechanism between an elevated transportation position and an operating position and to maintain alignment between the grinding mechanism and the plane of the rails of the trackway. The lead screw is employed to control the vertical positioning of the grinding mechanism both prior to and during operation of the grinding mechanism to remove the base portion of the welding flash of the welded joint.

12 Claims, 4 Drawing Figures

INVENTORS:
LESTER N. HAMBRICK
CARL C. FLOWERS

Richards, Harris & Hubbard
ATTORNEYS

INVENTORS:
LESTER N. HAMBRICK
CARL C. FLOWERS

RAIL BASE GRINDING APPARATUS

This is a continuation of application Ser. No. 169,986, filed Aug. 9, 1971, now abandoned.

BACKGROUND AND SUMMARY OF THE INVENTION

This invention relates to a rail base grinding apparatus, and more particularly to a rail base grinding apparatus that is particularly useful in track welding operations.

The co-pending application of John F. Bryan, Jr., filed May 16, 1970, Ser. No. 55,470, relates to a track welding system for interconnecting rails in railroad tracks and similar trackways. In the practice of the Bryan invention, existing bolted joints between the rails of a trackway are removed after which the adjacent ends of the rails are joined by oxyacetylene welding. The welding operation produces welding flash which must be removed before the trackway can be returned to service.

The present invention comprises a rail base grinding apparatus useful in the practice of the Bryan invention to remove welding flash from the base portion of a welded joint. In accordance with the preferred embodiment of the invention, a grinding mechanism is mounted on a self-propelled vehicle for movement along a trackway to the location of a welded joint. Apparatus is provided for aligning the welding mechanism with the bottom surfaces of the rails and for engaging the grinding mechanism with welding flash of the welded joint that protrudes below the bottom surfaces of the rails. The welding mechanism is preferably of minimal overall height so that the flash can be removed without disturbing the tie base of the trackway.

DESCRIPTION OF THE DRAWINGS

A more complete understanding of the invention may be had by referring to the following Detailed Description when taken in conjunction with the accompanying Drawings, wherein.

DETAILED DESCRIPTION

Figure 1:
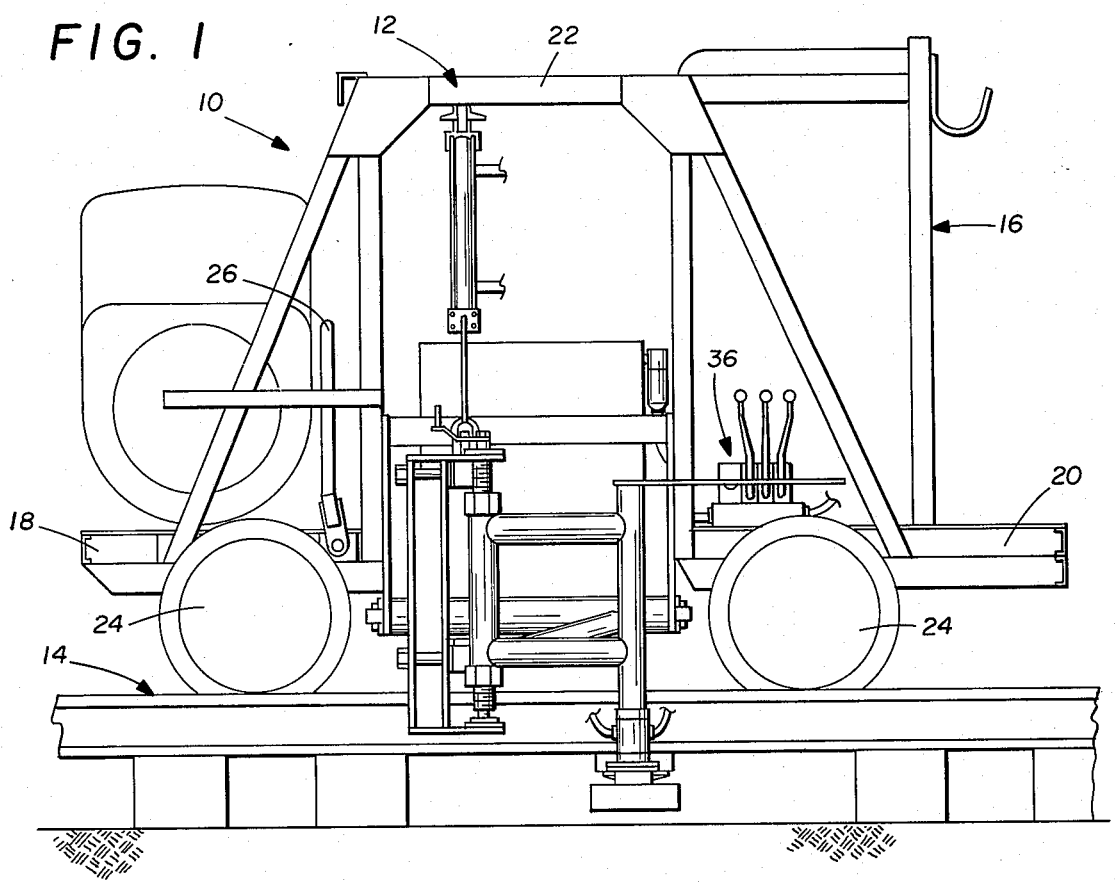
FIG. 1 is a side view of a rail base grinding apparatus incorporating the invention.

Referring now to the drawings, and particularly to FIG. 1 thereof, there is shown a rail base grinding apparatus 10 incorporating the present invention. The apparatus 10 comprises a vehicle 12 adapted for movement along a trackway 14 to a position over a welded joint between a pair of adjacent rails in the trackway. The vehicle 12 includes a frame 16 comprising a pair of end portions 18 and 20 and a superstructure 22 which extends between the end portions 18 and 20. The frame 16 is supported on the trackway 14 by four flanged wheels 24. A brake lever 26 is provided for actuating conventional brake assemblies to prevent rotation of the wheels 24 relative to the frame 16 and thereby arrest movement of the vehicle 12 along the trackway 14.

Figure 3:
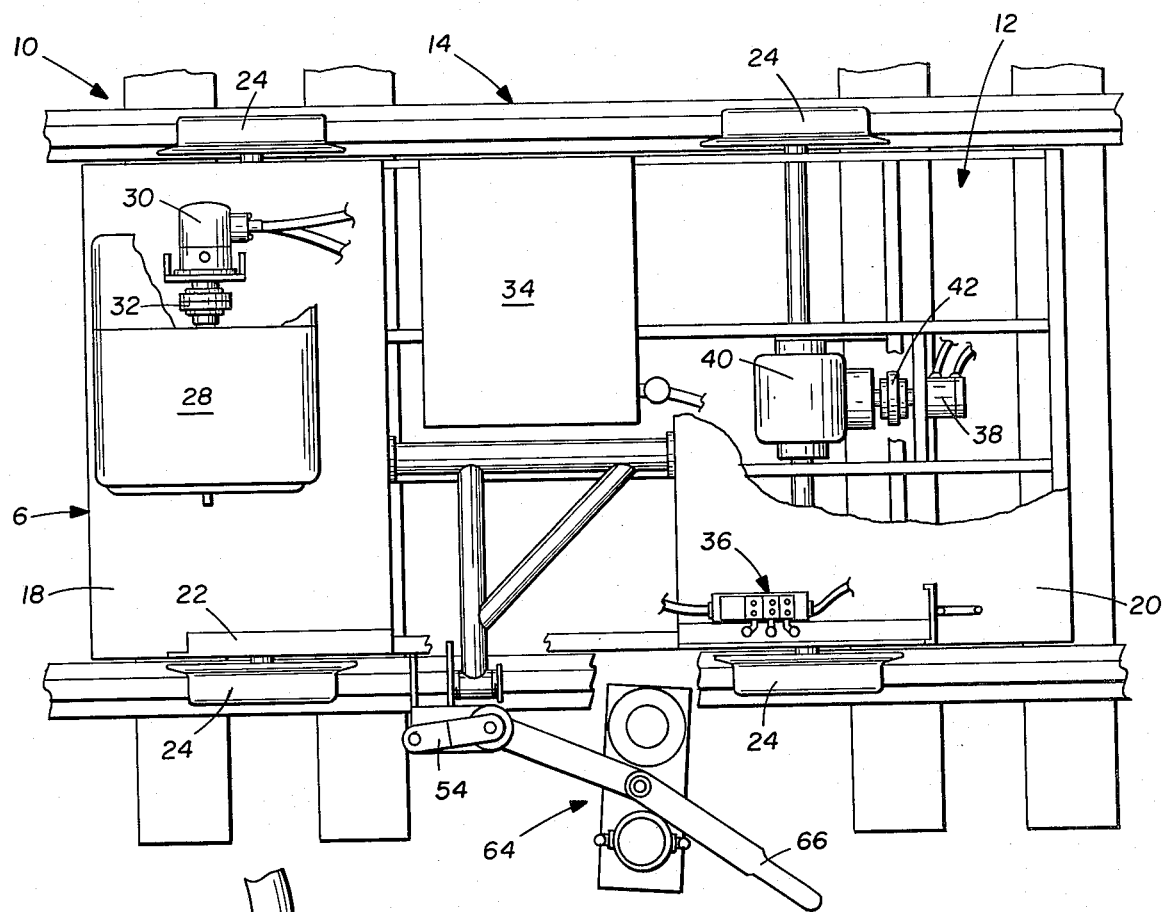
FIG. 3 is a top view of the rail base grinding apparatus in which certain parts have been broken away.

As is best shown in FIG. 3, an engine 28 is supported on the end portion 18 of the frame 16. The engine 28 drives a hydraulic pump 30 through a flexible coupling 32. The pump 30 functions to withdraw hydraulic fluid from a sump 34 and to supply pressurized hydraulic fluid to a valve assembly 36. The valve assembly comprises three manually operable valves which function to control the flow of hydraulic fluid from the pump 30 to the various operating instrumentalities of the rail base grinding apparatus 10. For example, one of the valves of the valve assembly 36 is operable to direct hydraulic fluid to a hydraulic motor 38 which is connected to a differential 40 through a flexible coupling 42. The differential 40 is in turn coupled to two of the flanged wheels 24, so that upon operation of the engine 28 and the appropriate valve of the valve assembly 36, the motor 38 propels the vehicle 12 along the trackway 14.

Figure 2:
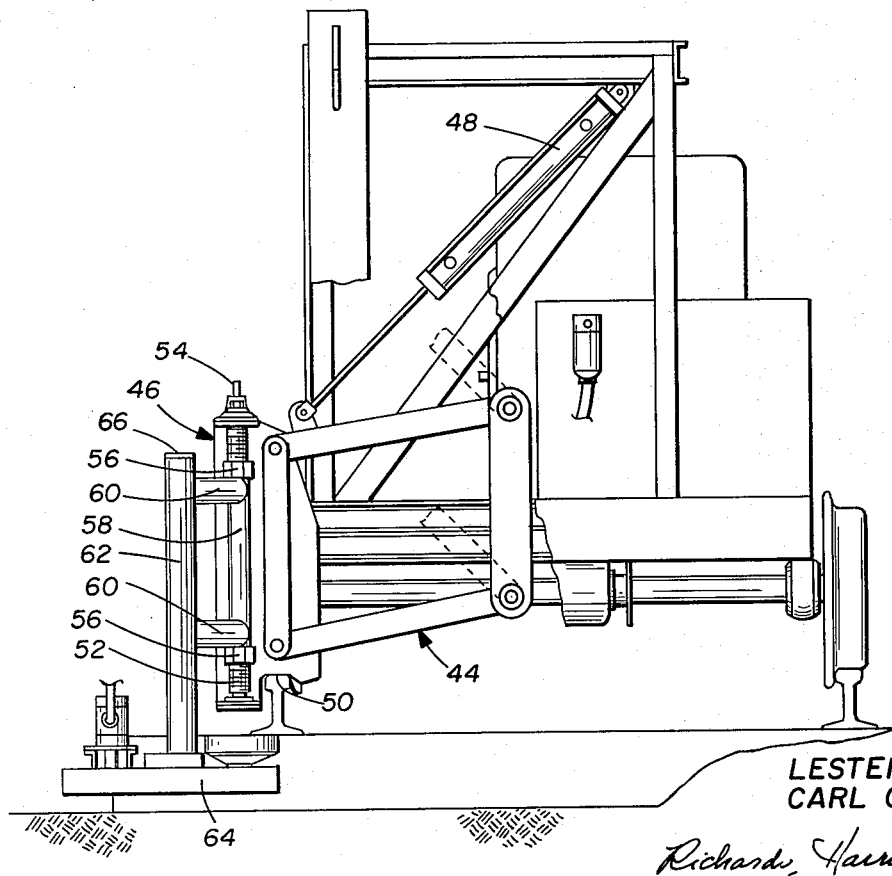
FIG. 2 is an end view of the rail base grinding apparatus shown in FIG. 1 in which certain parts have been broken away more clearly to illustrate certain features of the invention.

Referring now to FIG. 2, the rail base grinding apparatus 10 further includes a pantograph linkage 44 which is connected between the frame 16 and a subframe 46. A hydraulic cylinder 48 is connected between the frame 16 and the pantograph linkage 44 and is operable under control of one of the valves of the valve assembly 36 to manipulate the subframe 46 between the operating position shown in FIG. 2 and an elevated transportation position which is indicated by dashed lines. The subframe 46 includes a locating surface 50 which engages a rail of the trackway 14 to assure proper positioning of the subframe 46 when the hydraulic cylinder 48 is actuated to manipulate the subframe to the operating position.

A lead screw 52 is supported on the subframe 46 for rotation under the action of a handle 54. A pair of nuts 56 are threadably engaged with the lead screw 52, and a tube 58 is supported on the lead screw 52 by the nuts 56. A pair of arms 60 extend horizontally from the tube 58 and function to support a vertically extending column 62. A grinding mechanism 64 is supported on the column 62 for rotation with respect thereto under the action of a handle 66.

Figure 4:
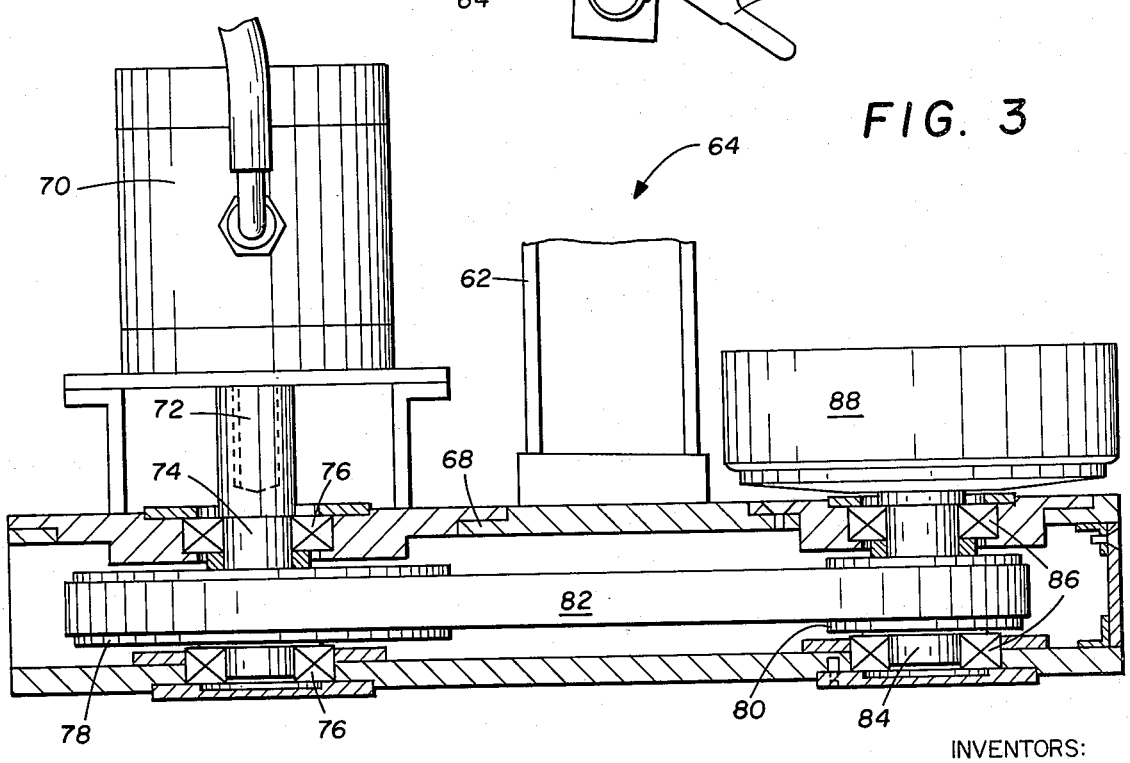
FIG. 4 is a sectional view of the grinding mechanism of the rail base grinding apparatus shown in FIG. 1.

Referring now to FIG. 4, the gringing mechanism 64 comprises a housing 68 which is supported by the column 62 and a hydraulic motor 70 which is mounted on the housing 68. The motor 70 operates under the control of one of the valves of the valve assembly 36 to rotate an output shaft 72. The shaft 72 is keyed to a shaft 74 which is supported in the housing 68 by a pair of bearings 76 and which in turn supports a sprocket 78.

The sprocket 78 of the grinding mechanism 64 is operatively coupled to a sprocket 80 by a toothed belt 82. The sprocket 80 is mounted on a shaft 84 which is supported in the housing 68 by a pair of bearings 86 and which in turn supports a grinding wheel 88. Thus, upon operation of the motor 70, the grinding wheel 88 is rotated relative to the housing 68.

OPERATION

The present invention is preferably employed to remove welding flash that results from the use of the above-identified invention of John F. Bryan, Jr., to form welded joints between the rails of a trackway. Initially, the hydraulic cylinder 48 is operated to raise the subframe 46 and the grinding mechanism 64 to the transportation position, and the motor 38 is actuated to position the vehicle 12 over a welded joint between adjacent rails in a trackway. When the vehicle 12 is properly positioned, the brake lever 26 is actuated to set the brakes of the vehicle, and the hydraulic cylinder 48 is actuated to lower the subframe 46 until the locating surface 50 thereof engages the upper surface of a rail in the trackway.

When the subframe 46 is in the operating position, the handle 54 is manipulated to position the grinding wheels 88 for engagement with flash which protrudes from the base portion of the welded joint beneath the bottom surfaces of the rails. Then, the motor 70 is actuated to rotate the grinding wheel and the handle 66 is manipulated to move the grinding wheel 88 into engagement with the welding flash. By this means, the flash is removed until the bottom surface of the welded joint is aligned with the bottom surfaces of the adjacent rails that are interconnected by the joint. It will be appreciated that in many instances it will be necessary to manipulate the handle 54 to adjust the vertical positioning of the grinding wheel 88 during the use of the grinding mechanism 64 to remove the welding flash.

When the grinding of the base portion of a particular welded joint has been completed, the operation of the motor 70 is discontinued and the handle 66 is manipulated to remove the grinding wheel 88 from beneath the rails of the trackway. Then, the hydraulic cylinder 48 is actuated to raise the subframe 46 to the transportation position. Finally, the motor 38 is actuated to propel the vehicle 12 along the trackway until the vehicle 12 is aligned with the next welded joint therein. Thereafter, the foregoing steps are repeated to finish the base portion of the welded joint.

The mechanism illustrated in the Drawings incorporates several structural features which are highly advantageous in a rail base grinding apparatus. For example, when a welded joint is formed between adjacent rails in a trackway, it is necessary to remove the ties from the trackway in order to provide access to the adjacent ends of the rails. On the other hand, it is desirable that the tie base of the trackway remain undisturbed so that it is not necessary to tamp or otherwise prepare the tie base prior to the replacement of the ties of the trackway. To this end, the total vertical height of the grinding wheel 88 and the housing 68 of the grinding mechanism 64 does not exceed the height of a standard tie, i.e., 5 ½ inches. This permits manipulation of the grinding wheel 88 under the rails of a trackway without disturbing the tie base of the trackway.

The use of the pantograph linkage 44 to support the subframe 46 of the rail base grinding apparatus 10 is also highly advantageous. This is because, due to the nature of a pantograph linkage, the angular relationship between the subframe 46 and the plane of the rails of the trackway remains constant, notwithstanding variations in the heights of the rails, etc. By this means, once the upper surface of the grinding wheel 88 of the grinding mechanism 64 is aligned with the bottom surfaces of the rails of the trackway, it remains in alignment therewith even though the hydraulic cylinder 48 is repeatedly operated to manipulate the subframe 46 between the operating position and the transportation position.

Still another advantageous structural characteristic of the rail base grinding apparatus shown in the Drawings is the use of the lead screw 52 to support the grinding mechanism 64. By this means, the vertical positioning of the grinding mechanism is readily and accurately controlled, both during the initial positioning of the grinding wheel 88 and during the grinding operation itself.

Yet another important structural feature of the present invention comprises the use of hydraulic actuators to drive the various operating instrumentalities of the device. This is advantageous in that only one power source is required and in that the usual complicated mechanical transmission are completely eliminated.

From the foregoing, it will be understood that the present invention comprises a rail base grinding apparatus including a self-powered vehicle for movement along a trackway, a grinding mechanism, and structure connected between the vehicle and the grinding mechanism for engaging the grinding mechanism with the base portion of a welded joint between two rails of the trackway. Preferably, the grinding mechanism supporting structure is adapted both to align the grinding mechanism with the bottom surfaces of the rails and to permit adjustment of the vertical positioning of the grinding mechanism during grinding operations. Also, the grinding mechanism preferably has a minimal overall height so that it is unnecessary to disturb the tie base of the trackway during grinding operations.

Although the preferred embodiment of the invention has been illustrated in the accompanying drawings and described in the foregoing specification, it will be understood that the invention is not limited to the embodiment disclosed, but is capable of rearrangement, modification, and substitution of parts and elements without department from the spirit of the invention.

What is claimed is:

1. In a rail welding system of the type in which welded joints are formed between rails in a trackway at a track site, a device for effecting in situ removal of weld flashing extending beneath the bottom surfaces of the base portions of the rails in the trackway and thereby facilitating the positioning of a tie under the welded joint which comprises:

a self-powered vehicle for movement along the trackway;

a grinding wheel having an upper grinding surface;

a linkage mechanism pivotally mounted on the vehicle and supporting the grinding wheel, said linkage mechanism for positioning the upper grinding surface of the grinding wheel in a horizontal plane extending parallel to the bottom surfaces of the rails connected by the welded joint and for thereafter moving the grinding wheel with the upper grinding surface thereof remaining in said horizontal plane to engage the upper grinding surface of the grinding wheel with weld flashing of the welded joint extending beneath the plane of the bottom surfaces of the base portions of the rails connected by the welded joint; and means for rotating the grinding wheel during the movement thereof and thereby removing the flashing of the welded joint which extends beneath the plane of the bottom surfaces of the joint.

2. The grinding device according to claim 1 wherein the linkage mechanism which supports the grinding wheel comprises means for selectively positioning the grinding wheel in an upper position to permit movement of the vehicle along the trackway and in a lower position for engagement with flashing of a welded joint extending beneath the plane of the bottom surfaces of the rails.

3. The grinding device according to claim 2 wherein the means for supporting the grinding wheel on the vehicle comprises a pantograph linkage connected between the vehicle and the grinding wheel.

4. The grinding device according to claim 3 further including a lead screw for supporting the grinding wheel on the pantograph linkage and for permitting adjustment of the vertical positioning of the grinding wheel relative to the vehicle.

5. The grinding device according to claim 1 wherein the grinding wheel rotating means comprises a drive motor and transmission means forming a drive connection between the drive motor and the grinding wheel.

6. The grinding device according to claim 5 wherein the linkage mechanism supports the grinding wheel, the transmission means and the drive motor for movement relative to rails connected by a welded joint.

7. The grinding device according to claim 6 wherein the linkage mechanism is further characterized by means for adjusting the vertical positioning of the grinding wheel, the transmission means, and the drive motor.

8. A grinding apparatus for finishing the base portions of welded joints formed between adjacent rails in a trackway comprising:
a vehicle for movement along a trackway to a position over a welded joint therein;
a grinding wheel supported for rotation about a vertical axis;
a pantograph linkage extending from one side of the vehicle for supporting the grinding wheel on the vehicle and for moving the grinding wheel relative to the vehicle between a transportation position and an operating position; and
means for supporting the grinding wheel on the pantograph linkage and for permitting movement of the grinding wheel from the operating position into engagement with the base portion of a welded joint in the trackway.

9. The grinding apparatus according to claim 8 wherein the pantograph linkage moves the grinding wheel substantially vertically between the transportation position and the operating position and wherein the means for supporting the grinding wheel on the pantograph linkage permits horizontal movement of the grinding wheel from the operating position into engagement with flash protruding from the welded joint.

10. The grinding apparatus according to claim 9 wherein the means for supporting the grinding wheel on the pantograph linkage also supports a drive motor for rotating the grinding wheel and means operatively connecting the grinding wheel to the drive motor for rotation thereby.

11. The grinding apparatus according to claim 8 wherein the vehicle further comprises an engine, a hydraulic pump driven by the engine, a hydraulic motor for propelling the vehicle along the trackway, and means for selectively directing hydraulic fluid from the hydraulic pump to the hydraulic motor.

12. The grinding apparatus according to claim 11 further characterized by a hydraulic cylinder for actuating the pantograph linkage to move the grinding wheel between the transportation position and the operating position, a hydraulic motor for rotating the grinding wheel, and means for selectively directing hydraulic fluid from the hydraulic pump to the hydraulic cylinder and to the hydraulic motor.

* * * * *